No. 873,366. PATENTED DEC. 10, 1907.
J. S. GILES.
CLOSURE GASKET AND PROCESS OF MAKING THE SAME.
APPLICATION FILED JUNE 21, 1907.
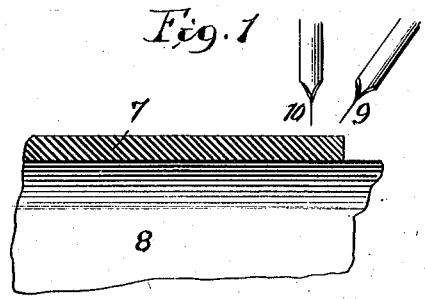
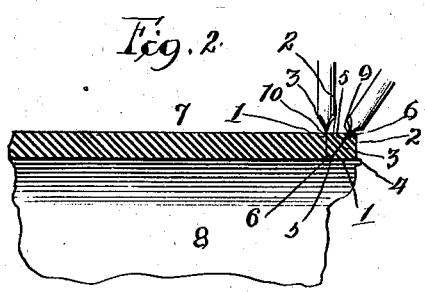
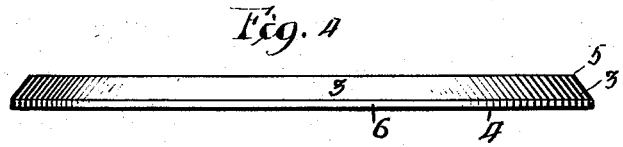
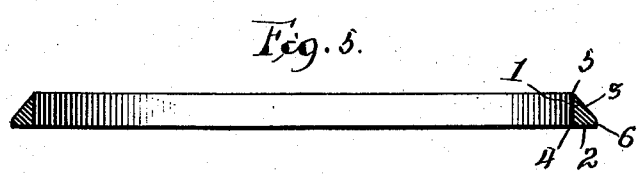
Witnesses
Wm P. Bond
Pierson W. Banning
Inventor:
John S. Giles
by Banning & Banning
Attys.

UNITED STATES PATENT OFFICE.

JOHN S. GILES, OF CHICAGO, ILLINOIS.

CLOSURE-GASKET AND PROCESS OF MAKING THE SAME.

No. 873,366.　　　Specification of Letters Patent.　　　Patented Dec. 10, 1907.

Application filed June 21, 1907. Serial No. 380,089.

*To all whom it may concern:*

Be it known that I, JOHN S. GILES, a citizen of the United States, residing at Chicago, in the county of Cook and State of Illinois, have invented certain new and useful Improvements in Closure-Gaskets and Processes of Making the Same, of which the following is a specification.

This invention relates to an improved gasket or sealing ring for use as a closure in the hermetic sealing of jars or receptacles, and to the process of making such gaskets or sealing rings.

The gasket or sealing ring of the closure for hermetically sealing jars and receptacles, as employed in the present invention, is of the class termed or known as wedging closures, in which the gasket or sealing ring is compressed by the application of the cover of the jar or receptacle in such manner as to force the gasket or sealing ring against the shouldered flange of the jar or receptacle and the exterior face of the neck or rim of the jar or receptacle above the shouldered flange.
It has been the practice heretofore to employ a gasket or sealing ring, circular in cross section in one form, and another form of gasket or sealing ring is square in cross section, and still another form is that of a rhomboid in cross section, with parallel oblique upper and lower edges and parallel plane sides.

The gaskets of the various types heretofore employed, irrespective of their form in cross section, have been applied to the jar or receptacle and supported, prior to the sealing of the jar or receptacle, above the shouldered flange and encircling the exterior of the rim or neck of the jar or receptacle, and the completing of the sealing by forcing down the cover will cause the gasket, no matter of what form, as heretofore used, to be deflected from its original shape or formation more or less, and it has been found, in the use of the old styles of gaskets, that a portion thereof is forced down between the inner face of the flange of the cover and the edge or corner of the flanged shoulder on the jar or receptacle, and this without in any manner perfecting the seal, though requiring an additional force to be applied to the cover in sealing the jar or receptacle.

The best sealing result is attained by compressing the gasket closely and tightly into the corner at the juncture of the rim or neck and the flange of the jar or receptacle; and, as a matter of fact, with the old types of sealing gaskets or rings, the forcing down of the cover to perfect the seal, instead of compressing the gasket or sealing ring into the corner failed to so compress the gasket or sealing ring, with the result that more or less leakage has been known to occur between the cover and the jar around the gasket or sealing ring, owing to imperfections in the contact of the gasket with the jar or receptacle, and to the fact that the gasket or sealing ring is not uniformly compressed to make a close tight joint against leakage between the cover and the jar or receptacle, and particularly so at the corner of the neck or rim and the flange.

The objects of the present invention are to furnish a closure gasket or sealing ring of a triangular shape in cross section that will allow of the easy placing and forcing down of the cover and have the cover, as it is forced down, position the gasket so as to force the corner thereof into the corner between the upper face of the flange and the exterior face of the rim or neck of the jar or receptacle and in a uniform manner at all points to thereby prevent leakage between the cover and the jar or receptacle, and to the process of making the triangular shaped gasket or sealing ring of the invention.

In the drawings Figure 1 is a detail, showing a mandrel on which is mounted the rubber tube, shown in section, from which the gaskets or sealing rings are cut, and showing the cutters in their withdrawn position; Fig. 2 a similar view to Fig. 1, showing the cutters in their advanced position for dividing or cutting the tube into the gaskets or sealing rings; Fig. 3 a similar view to Fig. 1 without the cutters, and showing the gaskets or sealing rings severed and separated from the tube and from each other; Fig. 4 a side elevation of a gasket or sealing ring of the invention; and Fig. 5 a sectional elevation of the gasket or sealing ring shown in Fig. 4.

The gasket or sealing ring of the present invention, in the preferred form of producing the same, is cut from a tube of rubber or other suitable compressible material, and is of a triangular form in cross section having a straight or plane inner face 1, a straight or plane lower edge face 2, and a diagonal or oblique outer face 3, so as to furnish a right angle corner 4 at the juncture of the inner side face 1 and lower edge face 2, and an acute angle corner 5 at the juncture of the side face 1 and oblique face 3 at the top and an acute angle corner 6, at the juncture of the lower plane face 2 and the face 3 at the bottom, which corner, when in its original shape, after being cut, has a narrow flat face or edge, as shown in Figs. 4 and 5, which corner, however, when the gasket or sealing ring is applied to the jar or receptacle, is drawn down so as to present an acute corner for the gasket or sealing ring, when in place on the jar or receptacle to present a triangular shape in cross section.

The gasket or sealing ring, when used, will have the straight plane face 1 in contact with the exterior face of the neck or rim of the jar or receptacle and will have the straight plane face 2 in contact with the straight plane face of the upper shoulder of the flange of the jar or receptacle, with the right angle corner 4 entered into the corner between the shoulder of the flange and the exterior face of the rim or neck, and with the acute angle corner at the top and the acute corner at the bottom. The triangular shape of the gasket or sealing ring is one by which the most advantageous effects are produced in closing or sealing the jar or receptacle.

The improved gasket or sealing ring of the present invention may be made by what is known as the extrusion process, which produces a continuous strip of the required cross section, which strips are cut of the proper lengths and the ends of each strip are scarfed and cemented together to form the gasket or ring, but it is preferred to cut the gaskets or rings from a tube of rubber or other suitable material of the proper size, as, by this process of making the gaskets or sealing rings more desirable and economical results are obtained.

A process of cutting or forming the gaskets or rings is shown in Figs. 1 and 2, in which the tube of rubber or other material is placed or mounted on a suitable revolving mandrel 8, so as to be adjacent to an inclined cutter 9, and a straight cutter 10, which cutters, when in normal position, are out of contact with the tube, as shown in Fig. 1, but by advancing the cutters to the position shown in Fig. 2 and revolving the mandrel and tube, the cutters will act and sever the tube into a section which forms two gaskets or rings, which, when separated, present the formation in cross section shown in Fig. 3, each gasket or ring having the straight plane face 1, the lower straight plane face 2, and the oblique outer face 3, with the right angle corner 4 and the acute corner 5 and acute corner 6.

The closure gaskets of the various types heretofore used, when in place on the jar and forced to place by the cover, owing to their resiliency, furnish an unequal bearing, so that, with the best care possible in placing and forcing the cover down, more or less shifting of the cover is liable to and does occur, and such shifting of the cover results in an unequal pressure against the gasket, making it impossible to form a perfect seal between the cover and the jar; and again, owing to the formation of the old types of gaskets, in order to overcome the resiliency of the gasket and the natural tendency thereof to assume its original formation in cross section, great force must be used in applying the cover, and even with a force sufficient to overcome the resistance of the gasket it is impossible, in all cases, to so compress the gasket as to force its contact faces in close impingement against the companion faces of the cover and the rim and flange of the jar, so as to make an air tight joint at every point between the cover and the jar by the gasket. The contour of a round, rectangular or rhomboidal shaped gasket, such as heretofore used, presents a surface which must be compressed closely in order to have a full contact of surfaces between the cover and the gasket and between the gasket and the rim and flange of the jar, and unless the force applied to the cover is sufficient to compress the gasket so as to conform exactly to the surfaces of the cover and the rim or neck of the jar and the flange, an imperfect closure will follow. These objections, which have been found by actual practice in the use of the old types of gasket, are entirely overcome with the triangular shaped gasket of the present invention, which furnishes a straight plane face to coact with the straight plane face of the rim, and a straight plane bottom face to coact with the straight plane face of the shoulder of the flange, and an oblique or inclined face to coact with the outwardly turned or flared portion of the cover, with the result that, in forcing the cover to place, the flange of the cover impinges directly against the oblique face of the gasket and transmits a force inwardly and downwardly, by which the plane faces of the gasket will be brought closely against the plane faces of the rim and flange of the jar, and this without the requirement of any great force in placing the cover in position, as the oblique face of the gasket presents a surface over and against which the outwardly flared portion of the flange will readily pass, and in passing apply the necessary pressure to force and hold the gasket in place, making a tight closure between the cover and the jar.

The closures to which the foregoing considerations apply are used solely for packing food and other products under a vacuum. Atmospheric pressure alone is relied upon to hold the cover on and maintain a hermetic seal after vacuum is obtained. To make this satisfactory and commercially successful, not only must there be the highest possible vacuum, but the shape, application and direction of the cover must be such as to aid and increase the force of the air pressure at the sealing point. Hence the cover is constructed so that it bears on the gasket with a wedging force. The contrivance here aimed at is to have the contact faces at the sealing point conform in the jar, gasket and cover, so as to save the waste of pressure in forcing a conformity in the contact faces of the gasket to make the seal, and thus save an important percentage of leakage.

What I claim as new and desire to secure by Letters Patent is:

1. The process of making triangular shaped gaskets or sealing rings from a tube of yieldable material, which consists in revolving the tube and severing the gaskets or rings therefrom by a traversing straight cut and a traversing diagonal cut through the wall of the revolving tube at the required intervals, for the cuts to form a straight plane side face, a straight plane bottom face, a diagonal side face with a lower right angle, a lower acute angle corner and an upper acute corner, substantially as described.

2. The process of making a triangular shaped closure gasket or sealing ring, which consists in dividing two gaskets or rings from a tube of yieldable material by a straight line circumferential cut and a diagonal line circumferential cut, both cuts penetrating the wall of the tube, one at right angle and the other at an acute angle to the longitudinal plane of the tube, substantially as described.

3. A closure gasket or sealing ring of compressible and yieldable material and having a straight plane inner face, a straight plane bottom face, and a diagonal outer face, with a lower right angle corner, a lower acute angle corner and an upper acute angle corner, joining the three faces, substantially as described.

JOHN S. GILES.

Witnesses:
OSCAR W. BOND,
WALKER BANNING.